Oct. 26, 1965   C. F. WAITE ETAL   3,213,496
COOPERATING MATCHED PATTERN PLATE AND METHOD
Filed Oct. 29, 1962   5 Sheets-Sheet 1

INVENTORS
CARL F. WAITE
BY STEVEN A. SIMON
Owen & Owen
ATTORNEYS

Oct. 26, 1965 C. F. WAITE ETAL 3,213,496
COOPERATING MATCHED PATTERN PLATE AND METHOD
Filed Oct. 29, 1962 5 Sheets-Sheet 3

INVENTORS
CARL F. WAITE
BY STEVEN A. SIMON
Owen & Owen
ATTORNEYS

Oct. 26, 1965  C. F. WAITE ETAL  3,213,496
COOPERATING MATCHED PATTERN PLATE AND METHOD
Filed Oct. 29, 1962  5 Sheets-Sheet 4
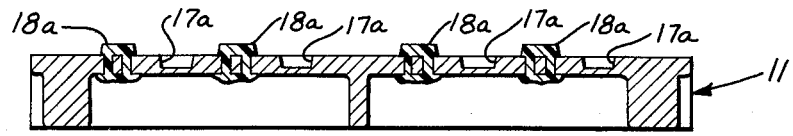
FIG.4.
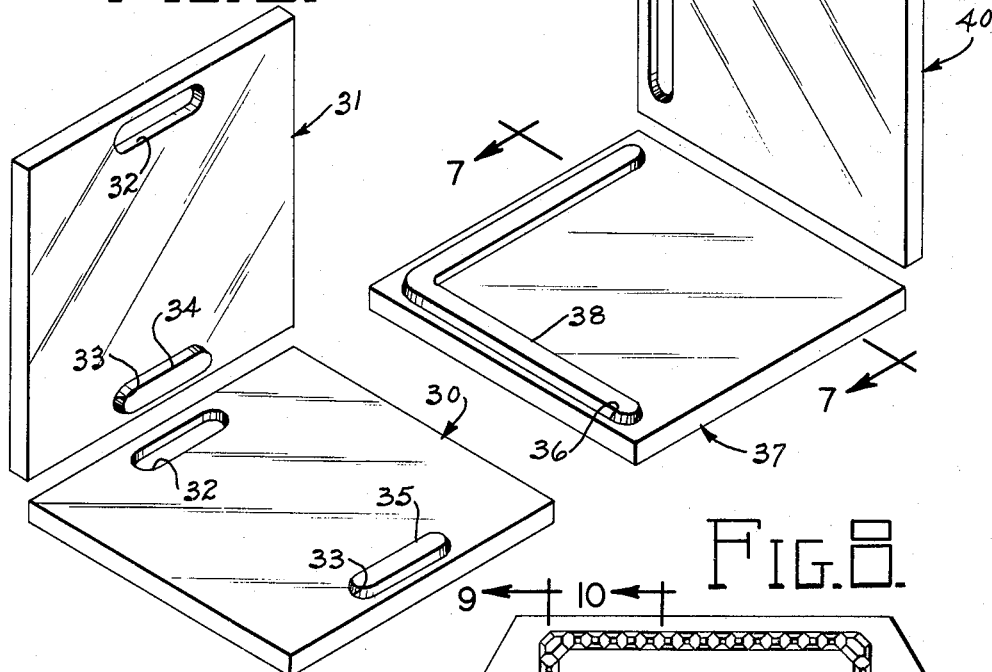
FIG.5.  FIG.6.
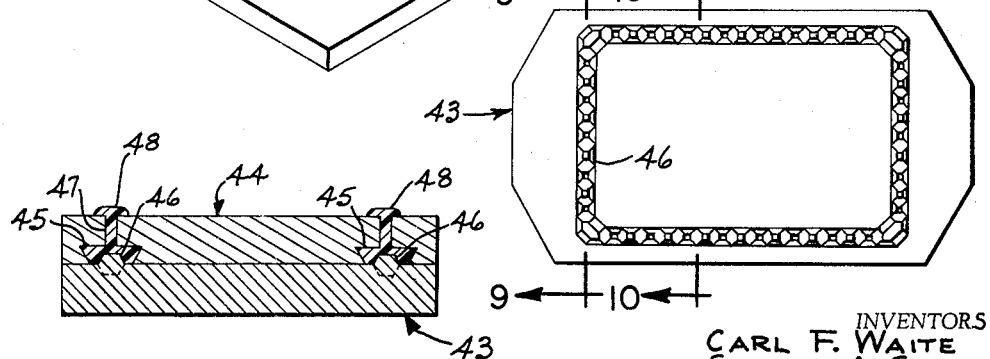
FIG.8.
FIG.10.
INVENTORS
CARL F. WAITE
STEVEN A. SIMON
BY
Owen & Owen
ATTORNEYS Oct. 26, 1965   C. F. WAITE ETAL   3,213,496
COOPERATING MATCHED PATTERN PLATE AND METHOD
Filed Oct. 29, 1962   5 Sheets-Sheet 5

INVENTORS
CARL F. WAITE
STEVEN A. SIMON
BY
*Owen & Owen*
ATTORNEYS

United States Patent Office 3,213,496
Patented Oct. 26, 1965

3,213,496
COOPERATING MATCHED PATTERN PLATE
AND METHOD
Carl F. Waite, Independence, and Steven A. Simon,
Parma, Ohio
Filed Oct. 29, 1962, Ser. No. 233,847
11 Claims. (Cl. 22—157)

The present application is a continuation-in-part application of our co-pending application Serial No. 14,010, filed March 10, 1960, now abandoned.

This invention relates to cooperating matched pattern plates, and to a method for producing such plates, and, more particularly, to such plates of the so-called "non-slip" type and to a method for the production thereof.

Various pattern plates of the "non-slip" type have heretofore been suggested for use in supporting a pattern or a plurality of patterns within a suitable flask while green sand or the like is packed around the pattern or patterns and into contact with a generally flat surface of the pattern plate to produce a mold into which molten metal ultimately is poured. The designation "non-slip," with respect to pattern plates, may be considered a misnomer, because the slippage that is prevented is not of anything relative to the pattern plate, but is of a mold part, a portion of which is formed by forcing sand against the pattern plate, relative to another such mold part.

The "non-slip" pattern plates that have previously been suggested fall into one of three general classes: (1) where buttons are provided extending above a mold-forming surface of a pattern plate to provide recesses in a mold half formed in contact therewith, and pockets are machined in a cooperating pattern plate surface for the purpose of forming cooperating male protrusions on a second half; (2) where a central pattern-supporting portion of a plate is raised or lowered relative to the periphery thereof, and (3) where a single pattern place includes recesses on one side and aligned bosses on the opposite side which are the male counterpart of the recesses. All of these several types of "non-slip" pattern plates have found some use in the art of producing sand molds, but all have certain inherent deficiencies. For example, careful machining is necessary to assure proper mating of cope and drag mold halves which rely upon the button and milled pocket technique to provide interlocking, and, the maximum cross-sectional area of any boss and projecting pocket is severely limited by the virtual necessity that the buttons and cooperating machined pockets be circular in every cross section. Cooperating cope and drag mold parts offering only limited non-slip characteristics are possible with offset or dished plates and careful, painstaking matching is required to provide satisfactory registry. Shrinkage of pattern plates with cast-in bosses on both sides and a cooperating pocket opposed to each boss, and particularly irregular or uneven shrinkage, has been found to impose a severe limitation upon the effectiveness of projections and cooperating recesses at preventing relative movement of cope and drag mold parts during normal foundry handling.

It might seem that many of the difficulties which have been encountered with previously known "non-slip" pattern plates, as discussed above, might be avoided by a careful, but limited, machining operation. Such, however, has been found not to be the case. If the slightest machining is performed on a "non-slip" pattern plate (types 2 and 3, above), every surface thereof must be carefully machined to re-establish all of the relationships which were originally intended relative to such slightly machined area. In addition, every surface of a cooperating pattern plate (whether the reverse side of the same plate, or a cooperating side of a second plate) must also be machined to match the first machined side. In addition, for any machining operation to be possible without causing a mis-mating of the ultimate cope and drag mold parts, an excess of metal must have been provided in the original casting so that mating cope and drag mold parts can be produced with a pattern plate or plates after the machining. Similar considerations militate against any machining of a pattern plate of type 1 after the pockets have been milled and the buttons have been inserted, unless oversize buttons were initially employed so that a complete machining of all of the buttons is necessary.

When separately formed cope and drag mold parts must be joined to form a completed mold, the previously discussed difficulties with "non-slip" pattern plates which have heretofore been suggested are magnified many times. The production of such cope and drag mold parts necessitates the use of two different pattern plates, and the projections on one must form recesses in a mold part which are matched exactly by projections on another mold part produced in contact with the other pattern plate. Furthermore, every irregularity on one of the pattern plates caused by uneven shrinkage must be matched exactly by a corresponding irregularity on the other pattern plate. Deviations plus or minus about fifteen thousandths of an inch are considered acceptable according to good foundry practice for castings in the as cast condition, and since tolerances of plus or minus about two thousandths of an inch are required for the production of mating, non-slip cope and drag mold parts, the use of pattern plates in the as cast condition for the production of such cope and drag mold parts is a virtual impossibility in the present state of the art. Since machining of a pattern plate is not a practical solution to the problem, the art, so far as is known, has sought other expedients than "non-slip" pattern plates to prevent relative moment between cope and drag mold parts where those parts have been produced separately.

The instant invention is based upon the discovery of a pair of improved cope and drag pattern plates which are flat within acceptable tolerances, and which can be used to produce cope and drag mold parts with raised portions and cooperating recesses which mate substantially perfectly. The invention is also based upon the discovery of an improved method for producing a pair of such pattern plates.

It is, therefore, an object of the invention to provide a pair of improved cooperating cope and drag pattern plates.

It is a further object of the invention to provide an improved method for producing a pair of cooperating pattern plates.

Other objects and advantages will be apparent from the description which follows, reference being made to the accompanying drawings, in which:

FIG. 4 is a cross sectional view taken approximately on the line 4—4 of FIG. 3;

FIG. 5 is an isometric view of a pair of pattern plates having a slightly different embodiment of keying structure from that shown in FIGS. 1 through 4;

FIG. 6 is an isometric view of a pair of pattern plates similar to that of FIG. 5 and showing still another embodiment of keying structure;

FIG. 8 is a plan view of a conventional cast pattern plate showing a prior art keying configuration that is made up of alternately spaced truncated pyramidal shaped projections and valleys which surround the central area on which a half pattern is to be mounted;

FIG. 10 is a cross sectional view taken approximately on the line 10—10 of FIG. 8 and showing a section of a matching pattern plate whose matching configuration is made by means of the present invention.

According to principles of the present invention, a keying or doweling structure is provided for two mating parts, and more particularly for a pair of matched pattern plates, wherein a hardenable material, as for example a metal or plastic, is forced into the area between the abutting plates in the region that is to provide the keying structure, so as to flow into and be received in previously formed rough cast or machined valleys to dowel or key the plates together. It will be readily apparent that this method of providing a keying construction is very versatile, and that any amount of machining can be done prior to the casting of the keying structure in place without requiring a corresponding machining of the keying configuration. For example, the pattern plates need not be cast, but can be made of rolled steel plates, and the keying or doweling areas need not extend around the whole periphery of the pattern plates. It is essential that the plates be flat and planar to within five thousandths of an inch, and preferred that they be flat and planar to within two thousandths of an inch.

Figure 1:
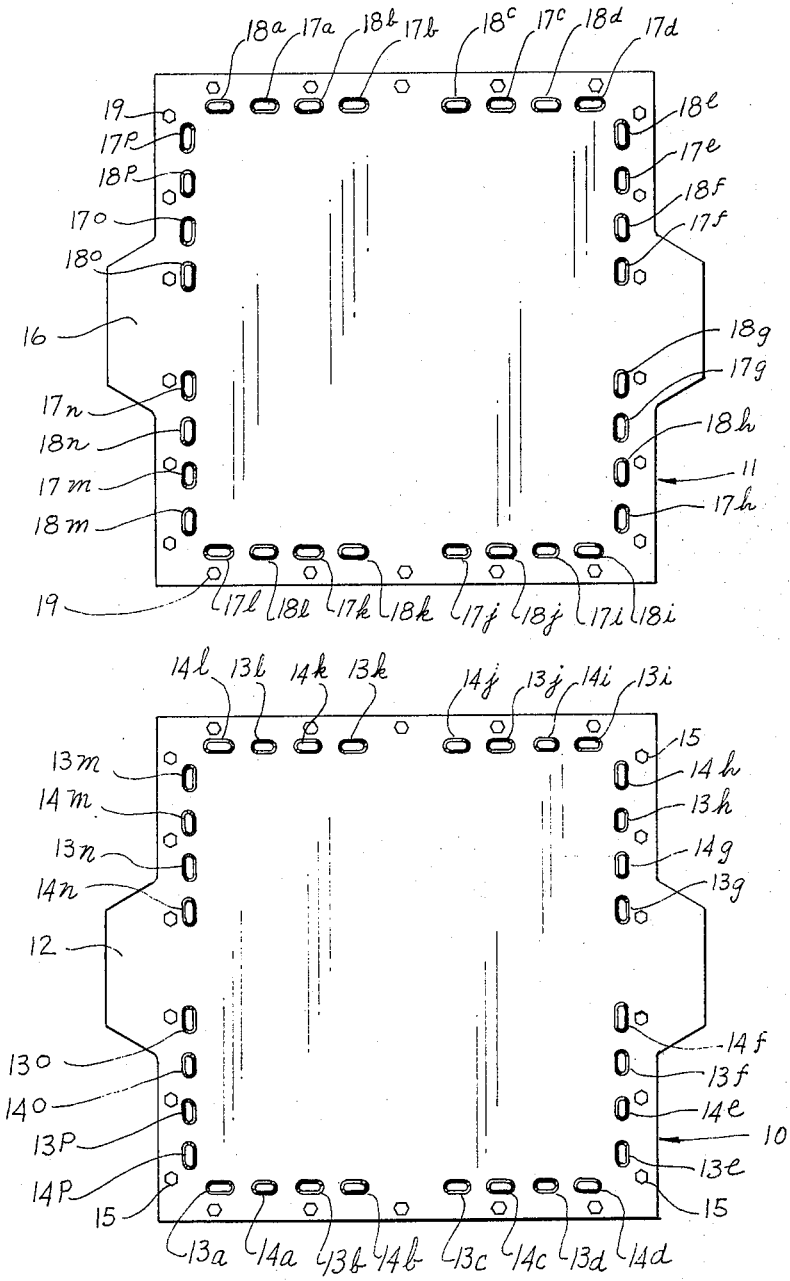
FIG. 1 is a plan view of a pair of cooperating matched pattern plates according to the invention.

Referring now in more detail to the drawings, and, in particular, to FIG. 1, a first pattern plate according to the invention is indicated generally at 10, while a second, cooperating, matched pattern plate is indicated generally at 11. The pattern plate 10 has a generally flat upper surface 12, in which are machined a plurality of recesses 13a, 13b, 13c . . . 13p. Adjacent at least one of each of the recesses 13a . . . 13p is a raised body 14a, 14b, 14c . . . 14p of a hardened material which has a composition different from that of the plate 10, but is structurally integral therewith. As will subsequently be discussed in more detail, each of the raised bodies 14a . . . 14p is of a composition different from that of the plate 10; each is also spatially remote from the adjacent one or ones of the recesses 13a . . . 13p. The pattern plate 10 also includes a plurality of wear buttons 15 upon which a flask (not shown) rests when a mold is being produced in contact with a pattern or patterns (not shown) mounted on the plate 10.

Figure 2:
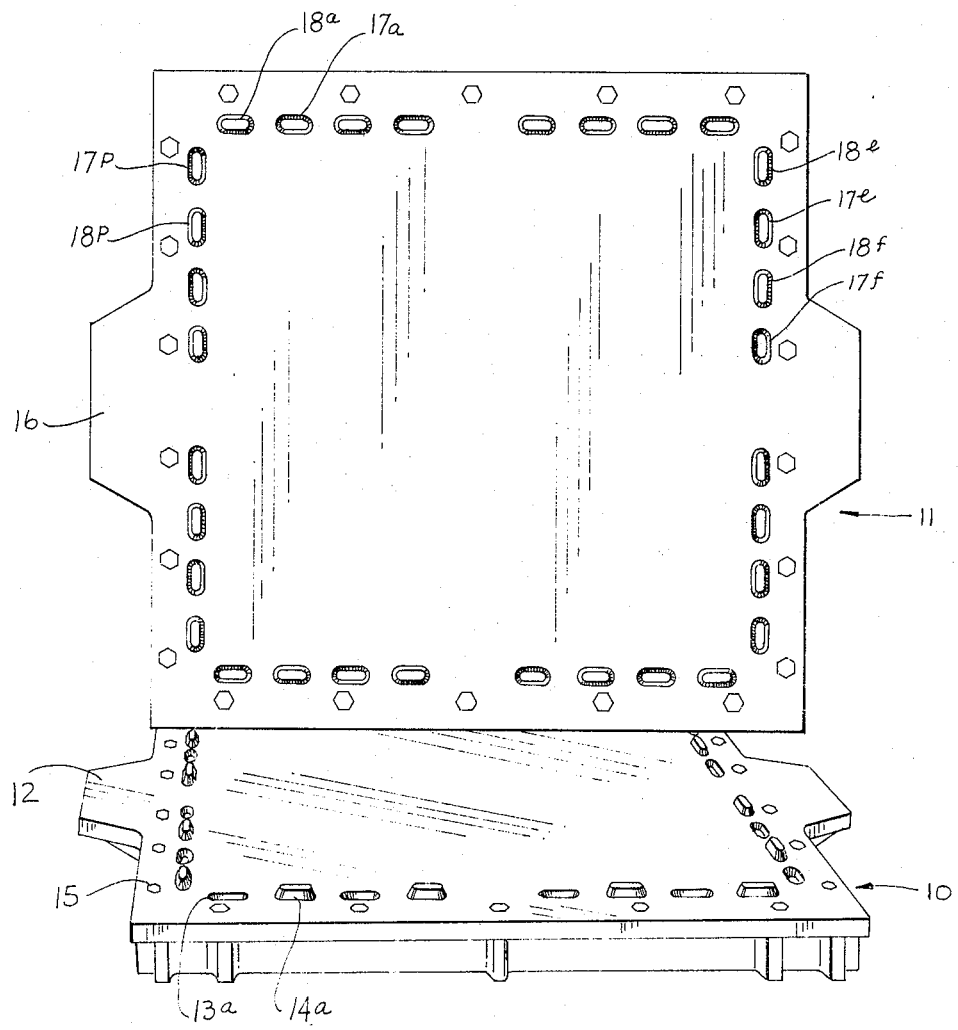
FIG. 2 is a view in perspective showing one of the pattern plates of FIG. 1 in a generally vertical position and the other in a generally horizontal position.

The pattern plate 11 is similar to the plate 10, having a generally flat upper surface 16 which has been machined to be substantially a mating surface relative to the surface 12 of the plate 10. The plate 11 also includes a plurality of recesses, 17a, 17b, 17c . . . 17p, and a plurality of raised bodies 18a, 18b, 18c . . . 18p. The raised bodies 18a . . . 18p are structurally integral with the plate 11, but differ therefrom in composition. The pattern plate 11 also includes a plurality of wear buttons 19, which are similar to the buttons 15, and correspondingly placed. As will be more fully apparent from the description which follows of the production of the pattern plates 10 and 11, when the pattern plate is inverted by pivoting it generally about an axis through its lower edge to bring its surface 16 adjacent the surface 12 of the plate 10, and the plate 11 is translated into vertical alignment with the plate 10, the raised body 18a is received in the recess 13a, the raised body 18b is received in the recess 13b, the raised body 18c is received in the recess 13c, etc., and each of the raised bodies 14a . . . 14p of the plate 10 is received in the corresponding one of the recesses 17a . . . 17p of the plate 11. These relationships will be readily appreciated from FIG. 2, which shows the pattern plate 11 in a vertical position and the pattern plate 10 in a horizontal position, part of the rotation necessary to bring the recesses 13 and raised bodies 14 into registry relative to the raised bodies 18 and recesses 17 having been accomplished. Each of the raised bodies 14 is the male counterpart of the corresponding recess 17, and each of the raised bodies 18 is the male counterpart of the corresponding recess 13. When the pattern plates 10 and 11 are aligned and mated, as described, the raised bodies 14 and 18 substantially completely fill the corresponding recesses 17 and 13, respectively.

In service, at least one pattern part (not illustrated) is mounted on the pattern plate 10 in any suitable manner, interiorly of the recesses 13 and raised bodies 14, and a cooperating pattern part is similarly mounted on the plate 11, correspondingly positioned, relative to each such part mounted on the plate 10. Cope and drag mold parts are then produced by packing sand within suitable flasks (not illustrated) in contact with the pattern part or parts and the plate 10, in one case, and with the corresponding pattern part or parts and the plate 11 in the other. When the sand is so packed, each of the recesses 13 in the plate 10 is filled thereby, and each of the raised bodies 14 forms a recess therein. Similarly, each of the recesses 17 of the pattern plate 11 is filled by the sand, and each of the raised bodies 18 forms a recess in the mold part. Accordingly, by virtue of the mating relationships between the pattern plate 10 and the pattern plate 11, the mold parts have cooperating male and female portions which are substantial mates, and which are effective to lock the cope and drag mold parts relative to one another. It will be appreciated that pattern parts used in producing molds can be attached directly to the pattern plates 10 and 11, or that they can be attached to auxiliary plates which are in turn attached to the plates 10 and 11. In the latter instance, it is usually preferred to provide a recess in the central portion of the plates 10 and 11 so that, when the auxiliary plates are fastened thereto, the resulting assemblies have a single, substantially planar surface made up in part of a surface of the plates 10 and 11, and, in part, of a surface of the auxiliary plates.

The production of the pattern plates 10 and 11 involves an initial casting operation which is carried out in suitable molds in which the wear buttons 15 and 19 have been appropriately positioned to be embedded in the completed castings, machining the completed castings to provide the mating surfaces 12 and 16, machining the recesses 13a . . . 13p and 17a . . . 17p in the surfaces 12 and 16, drilling or otherwise providing passages through the plate 10 corresponding in position with at least a portion of the projection on the surface 12 of each of the raised bodies 14a . . . 14p, drilling or otherwise providing passages through the plate 11 corresponding in position with at least a portion of the projection on the surface 16 of each of the raised bodies 18a . . . 18p, mating the two plates, forcing a hardenable flowable material which shrinks or expands, upon hardening, not more than about 0.005 inch per inch through the openings or passages in each of the plates 10 and 11 and into each of the recesses 13a . . . 13p and into each of the recesses 17a . . . 17p, and hardening the material while it fills the recesses 13 and 17. It will be appreciated that forming of each of the raised bodies 14 and 17 in the manner indicated assures substantially complete and perfect mating between the two plates, and also between cope and drag mold parts produced in contact therewith, as described above.

The production of the pattern plates, with or without the wear buttons 15 and 19 embedded therein, is a simple casting operation, and need not be described in detail herein. Although the instant invention is principally concerned with the provision of mating recesses and raised bodies, the method is well suited for use in connection with the production of plates having wear buttons. It is impractical to produce pattern plates which include wear buttons and which are ready for use in the as cast condition, without a machining operation. Since the method by which pattern plates according to the invention are produced contemplates a machining operation before the raised bodies and recesses are provided, it is immaterial, insofar as the provision for "non-slip" characteristics is concerned, whether or not the wear buttons have been provided. It will be appreciated that it is advantageous to machine the mating surfaces of the pattern plates to a substantially flat or planar condition, but that any other desired contour which might be preferred could be provided, so long as the machined plates are substantial mates.

As has been indicated above, after two pattern plates have been machined to provide substantially mating surfaces, the recesses 13 are machined in one of the plates, and the recesses 17 are machined in the other. Neither the number nor the shape of these recesses is critical, since raised bodies which are substantially mates therefor are produced subsequently to cooperate therewith. The recesses are usually positioned as nearly as possible to the outer edge of the plates in order to minimize the encroachment on the pattern-supporting portion of the plate, and preferably have longitudinal axes generally parallel to an adjacent outer edge. Passages are then drilled, bored, or otherwise provided through each plate to provide communication from the under side thereof to a portion of the machined surface corresponding in position with at least a portion of each of the recesses in the other plate, and the two pattern plates are then mated.

The final steps in the method for producing matched pattern plates according to the invention, as has been indicated above, involve forcing a hardenable material having certain characteristics through the passages in each of the pattern plates and into each of the recesses in the other of the plates while the two are mated, and hardening the material. This material must be one which is flowable, or capable of being so forced into the several recesses, and it must also be one which does not shrink or expand excessively upon hardening. Preferably, any dimensional change, upon hardening, is a shrinkage. Any of various low melting alloys can be used for this purpose provided that the passage or passages through which they are poured into a mating recess are contoured to provide mechanical locking relative to the pattern plate with which the raised bodies are structurally integral. Examples of low melting alloys which undergo sufficiently slight dimensional changes, during solidification after casting, for use as described are set forth in the following table:

Table
[Composition in Percent by Weight]

| | Bismuth | Lead | Tin | Cadmium | Indium | Antimony |
|---|---|---|---|---|---|---|
| Alloy No. 1 | 44.7 | 22.6 | 8.3 | 5.3 | 19.1 | |
| Alloy No. 2 | 48.0 | 28.5 | 14.5 | | | 9.0 |
| Alloy No. 3 | 50.0 | 26.7 | 13.3 | 10.0 | | |
| Alloy No. 4 | 42.5 | 37.7 | 11.3 | 8.5 | | |
| Alloy No. 5 | 55.5 | 44.5 | | | | |
| Alloy No. 6 | 58.0 | | 42.0 | | | |

Although excellent results can be achieved with any of the above-identified alloys, pattern plates produced therewith have comparatively short service lives because the alloys themselves are soft, and wear to a considerable extent when subjected to the action of green sand in producing molds. As a consequence, it is usually preferred to use a mixture of an epoxy resin, an inert filler and a hardener for the epoxy for producing the raised bodies 14 and 18. Such compositions can be prepared from commercially available mixtures of an epoxy and a filler such as silica or a hard carbide, for example tungsten carbide, and a separately packaged hardener for the epoxy. The hardener is merely mixed with the epoxy-filler composition shortly before use, and the resulting mixture is poured or forced through the passages in each of the pattern plates and into the recesses in each of the other. A specific suitable composition can be hardened to produce a highly wear resistant body having the following specifications:

Ultimate compressive strength, 16,000 lbs. per square inch.
Tensile strength, 8,000 lbs. per square inch.
Flexural strength, 11,000 lbs. per square inch.
Impact strength relative, 0.8 ft. lb. per inch of notch (Izod).
Hardness Rockwell, F–93.
Resistance to heat, 300° F.
Dielectric constant, 2.9.
Specific volume—cubic inches per pound, 15–16.
Shrinkage on 4" x 3" x 1" casting, 0.00016 inch per inch.

Figure 3:
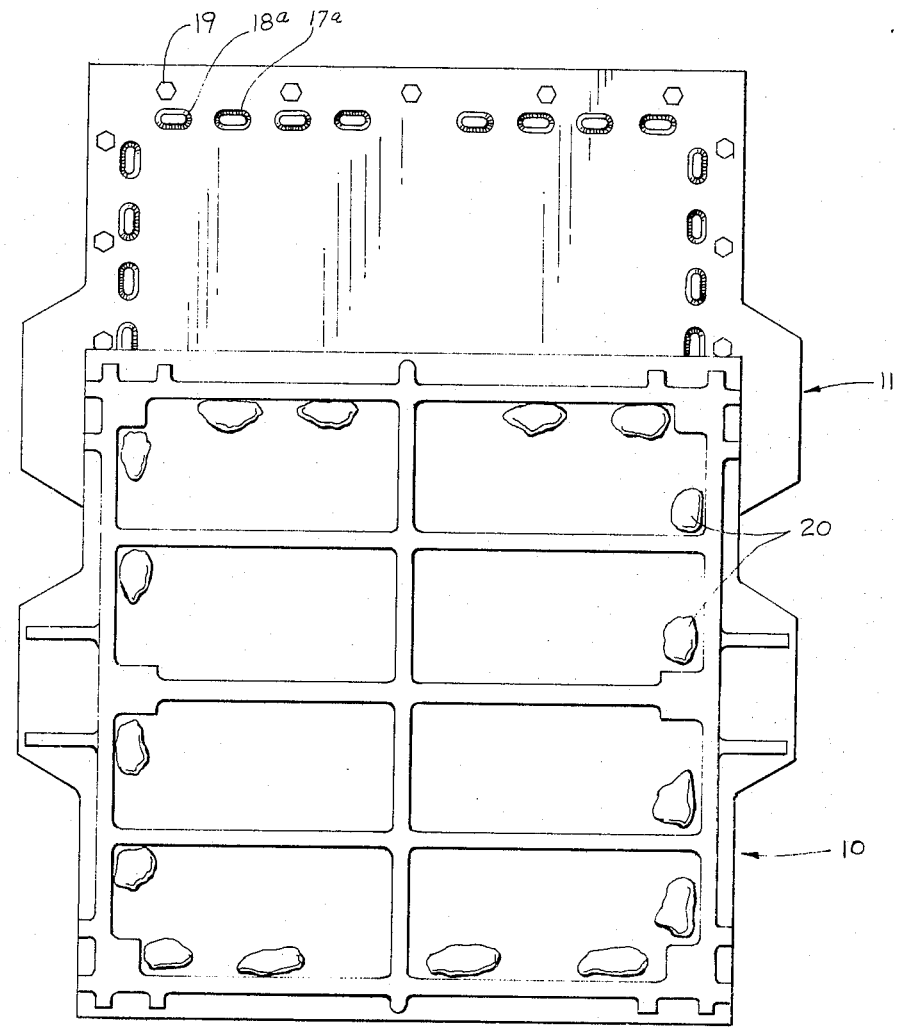
FIG. 3 is a view in perspective showing the under side of one of the pattern plates of FIG. 1, and a portion of the working surface of the other of the pattern plates.

The required epoxy resin-filler mixture and a suitable hardener can be purchased by reference to the foregoing specifications. As can be seen in FIG. 3, which shows the underside of the pattern plate 10 and a portion of the machined or mating surface 16 of the pattern plate 11, patches 20 of the material from which the raised bodies 14 and 18 are produced remain on the under side of the pattern plate. The patches 20 provide mechanical locking for the raised bodies 14 and 18 in addition to the adhesive locking which naturally occurs.

While a previous embodiment has been described as utilizing opposing recesses in opposite plates to form the keying areas, one of the plates can be provided with a rough projection which generally fits into a receiving keying area in the opposite plate and between which the hardened material is positioned to accurately key the two plates together.

The embodiment shown in FIG. 5 is made from two rolled steel plates 30 and 31, each of which has a pair of oblong recesses 32 and 33 in the opposite ends of its mating surface. Openings not shown extend from the recess 33 in the top plate to its top external surface, while similar openings extend from the recess 33 of the bottom plate to its bottom external surface. When the plates are booked and clamped together, a hardenable material in one of the recesses 33 forms a hardened body 34 in one end of the top plate while a hardenable material in the other of the recesses 33 forms a hardened body 35 in the opposite end of the bottom plate. Each of the recesses 32 and the cooperating bodies 34 and 35 can be thought of as providing opposite side abutment surfaces as well as opposite side abutment surfaces as well as opposite end abutment surfaces that extend generally at right angles to each other so as to prevent movement in all directions when the plates 30 and 31 are booked. Movement is similarly prevented between cooperating, mated, mold parts made with the plates 30 and 31.

Figure 7:
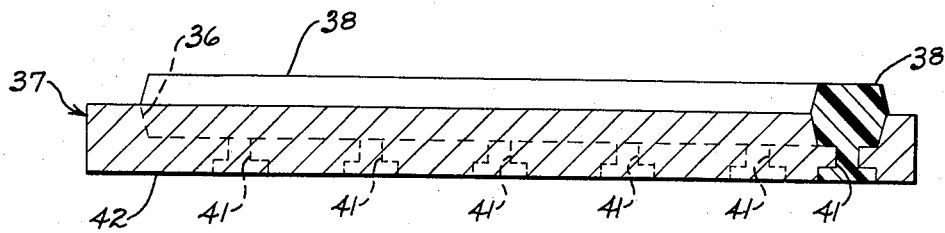
FIG. 7 is a cross sectional view taken approximately on the line 7—7 of FIG. 6.

The embodiment shown in FIG. 6 of the drawing is generally similar to that shown in FIG. 5, differing principally in that the hardened material is received in an L-shaped recess 36 in a bottom plate 37, and forms a projection 38 which matches a corresponding L-shaped recess 39 in a top plate 40. The projection 38 of the embodiment shown in FIG. 6 is locked in the bottom recess 36 by integral fingers which extend through openings 41 (best seen in FIG. 7) provided between the recess 36 and the bottom surface 42 of the plate 37. The integral fingers have radially enlarged lower ends to assure locking.

Figure 9:
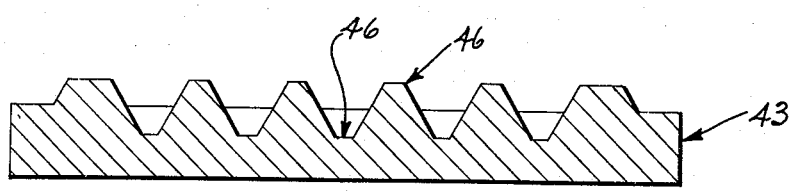
FIG. 9 is a cross sectional view taken approximately on the line 9—9 of FIG. 8.

A pattern plate 43 shown in FIGS. 8 and 9 is similar to a prior art construction and can be used according to the principles of the present invention in producing a matched pair of plates including a mating pattern plate 44, as shown in FIG. 10. This may be done in any of a number of ways, as for example by providing a rectangular groove 45 in the plate 44, which can be a rolled steel plate, in such manner that it overlies a keying section 46 of the plate 43 when the turn plates are booked. The rolled steel plate 44 is also provided with openings 47 which communicate between groove 45 and the opposite external surface. The flat portion of the two plates 43 and 44 are machined, ground, or the like, to provide the required match, and thereafter may be booked and clamped together in aligned position. A hardenable epoxy material is then forced through the openings 47 and into the rectangular recess 45 for flow around the keying area 46 of the pattern plate 43. Upon hardening, the epoxy material forms a body 48 which is locked to the plate 44, and is a substantially perfect match for the keying area 46 of the plate 43. The grinding or machining of the flat portions of the plates 43 and 44 can be performed either before or after the annular keying area 45 is provided, but must be done before the hardened material 48 is put in place.

While the invention has been described in considerable detail, it is not limited to the particular embodiments shown and described and it is intended to cover hereby all novel adaptations, modifications and arrangements thereof which come within the practice of those skilled in the art to which the invention relates.

What we claim is:

1. A pair of cooperating matched pattern plates and the like having generally flat, substantially mating surface areas which abut each other when said plates are placed into engagement with each other, each of said plates also having at least one key forming area, with one of said key forming areas being a recess in one of said plates, each of said key forming areas having at least two indexing abutment surfaces that extend generally at right angles to each other and to the flat mating surface of their plate, said indexing abutment surfaces of one plate being spaced apart and generally opposite from said indexing abutment surfaces of said other plate when said plates are booked, and at least one keying structure of a material different from that of said plates, each said keying structure being hardened in situ between said opposed key forming areas of said plates when booked.

2. A pair of cooperating matched pattern plates and the like having generally flat, substantially mating surface areas which abut each other when said plates are placed into engagement with each other, each of said plates also having at least one key forming area, with one of said key forming areas being a recess in one of said plates, said key forming areas of each plate having irregularly shaped surfaces which provide at least two indexing abutment surfaces on each plate that extend generally at right angles to each other and to the flat mating surface of their plate, said indexing abutment surfaces of one plate being spaced apart and generally opposite from said indexing abutment surfaces of said other plate when said plates are booked, and at least one keying structure of a plastic material hardened in situ between said opposed indexing abutment surfaces of said plates when booked to accurately position said plates relative to each other.

3. A pair of cooperating matched pattern plates and the like having generally flat, substantially mating surface areas which abut each other when said plates are placed into engagement with each other, each of said plates also having at least one key forming area spaced opposite the key forming area on the abutting plate when said plates are booked, with one of said key forming areas being a recess in one of said plates, said keying areas of each plate having irregularly shaped surfaces which provide at least two indexing abutment surfaces on each plate that extend generally at right angles to each other and to the flat mating surface of their plate, said indexing abutment surfaces of one plate being spaced apart and generally opposite from said indexing abutment surfaces of said other plate when said plates are booked, one of said plates having at least one opening connecting its key forming area to the generally opposite side surfaces of said plate, and at least one keying structure of a material different from that of said plates hardened in situ between said indexing abutment surfaces of said plates when booked and into said openings of said one of said plates whereby to position said plates accurately relative to each other and to cause said hardened material to be retained on said one of said plates.

4. A pair of cooperating matched pattern plates and the like having generally flat, substantially mating surface areas which abut each other when said plates are placed into engagement with each other, each of said plates also having at least one key forming area spaced around its flat mating surfaces with the key forming area of one plate spaced opposite the key forming area of the other plate, one of said key forming areas being a recess in one of said plates, each of said key forming areas being irregularly shaped to provide at least two indexing abutment surfaces on each plate that extend generally at right angles to each other and to the flat mating surface of their plate, one of said plates having at least one opening connecting its key forming area to the generally opposite side surfaces of said plate, and a keying structure of a plastic material hardened in situ between said indexing abutment surfaces of said plates when booked and into said openings of said one of said plates to accurately position said plates relative to each other and to cause said hardened material to be retained on said one of said plates.

5. A pair of cooperating matched pattern plates having generally flat, substantially mating surfaces, each of said mating surfaces having recess means therein which overlies the other of said surfaces when said mating surfaces are booked with each other, each of said recess means having at least two indexing surface areas that extend generally at right angles to each other and to its flat mating surface, and a keying structure of a material different from that of said plates hardened in situ in the recess means of one of said plates and having a configuration matching that of said indexing surface areas of said other one of said plates to accurately position said plates relative to each other when said mating surfaces engage each other and said keying structure abuts said indexing surface areas of said plates.

6. A pair of cooperating matched pattern plates having generally flat, mating surfaces, each of said flat mating surfaces having a plurality of recesses therein in such location as to generally overlie the recesses of the other plate when said mating surfaces are booked with each other, one of said plates having openings therethrough communicating its recesses with an external surface of said plate, and a hardened plastic material cast and hardened in situ in said recesses when booked and extending through said openings to be retained in the openings in said plate, whereby a plurality of projections are fixed to one of said plates which accurately align said one plate with the recesses of the other of said plates.

7. A method of producing a pair of matching surfaces which can be quickly brought into register relative to each other, comprising: booking a pair of members each of which has a flat mating surface and a keying area which will overlie each other, each of said keying areas having indexing abutment surfaces that extend generally at right angles to each other and to a said flat mating surface with the indexing surfaces of one plate opposing the indexing surfaces of the other plate, placing a hardenable material between said indexing surfaces when said members are booked together, causing said hardenable material to harden in situ in said keying areas between said indexing surfaces, and separating said members after said hardenable material has taken the shape of the space between said indexing surfaces to form an indexing means whereby said surfaces will be similarly spaced when said member and said indexing means are reassembled.

8. A method of producing a pair of mating surfaces which can be quickly brought into register relative to each other, comprising: booking a pair of members each of which have a flat mating surface and a keying area which overlie each other, said keying areas each having indexing abutment surfaces that extend generally at right angles to each other and to said flat mating surfaces and one of said members having at least one opening connecting its keying area to external surfaces positioned away from its mating surface, securing said members together with their mating surfaces in abutment, forcing a hardenable material through said opening into the recess formed by said opposed keying areas, to harden in situ, whereby said hardened material adheres to said member having said openings to provide an indexing means for said members when said members are brought together again.

9. A method of producing a pair of mating surfaces which can be quickly brought into register relative to each other, comprising: casting a pair of plates to provide mating surfaces with recess means in each that are generally centered with respect to each other when the surfaces abut each other and one of said members having at least one opening communicating its recess means with an external surface that is positioned away from its mating surface, and each of said recess means having indexing abutment surfaces that extend generally at right angles to each other and to its flat mating surface, matching said mating surfaces until each closely fits the other, securing said members together with their mating surfaces in accurately positioned abutment, forcing a hardenable material through said opening into said recess means to harden in situ, and whereby said hardened material adheres to said member having said opening to provide an indexing action for said members when said members are brought together again.

10. A method of producing a pair of mating surfaces which can be quickly brought into register relative to each other, comprising: providing a pair of plates having flat mating surfaces which accurately fit each other, machining recess means into each of said mating surfaces in such position as to generally overlie each other when said mating surfaces are accurately positioned in abutment with each other, each of said recess means having indexing abutment surfaces that extend generally at right angles to each other and to its flat mating surface, machining a plurality of openings in one of said plates communicating its recess means with other external surfaces of said plate, securing said members together with their mating surfaces in accurately positioned abutment, forcing a hardenable material through said opening into said recess means to harden in situ, and whereby said hardened material adheres to said member having said opening to provide an indexing action for said members when said members are brought together again.

11. A method of producing a pair of mating surfaces which can be quickly brought into register relative to each other, comprising: providing a pair of plates having flat mating surfaces which accurately fit each other, machining a plurality of recesses spaced around the outside perimeter of each of said mating surfaces in such position as to generally overlie each other when said mating surfaces are accurately positioned in abutment with each other, each of said recesses having indexing abutment surfaces that extend generally at right angles to each other and to its flat mating surface, machining a plurality of openings in one of said plates communicating various ones of said recesses with other external surfaces of said plate, securing said members together with their mating surfaces in accurately positioned abutment, forcing a hardenable material through said openings into said recesses to harden in situ, and whereby said hardened material adheres to said member having said openings to provide an indexing action for said members when said members are brought together again.

References Cited by the Examiner
UNITED STATES PATENTS

| | | | |
|---|---|---|---|
| 227,514 | 5/80 | Frary | 22—203 |
| 1,279,714 | 9/18 | Lang | 22—157 |
| 1,291,221 | 6/19 | Spellman | 22—158 |
| 1,347,093 | 7/20 | Haustine | 22—157 |
| 1,428,359 | 9/22 | Christianson | 22—157 |
| 2,382,053 | 8/54 | Hagemeyer | 22—157 |

WILIAM J. STEPHENSON, *Primary Examiner.*

MICHAEL V. BRINDISI, *Examiner.*